United States Patent
Rodrigues et al.

(10) Patent No.: US 8,312,187 B2
(45) Date of Patent: Nov. 13, 2012

(54) INPUT/OUTPUT DEVICE INCLUDING A MECHANISM FOR TRANSACTION LAYER PACKET PROCESSING IN MULTIPLE PROCESSOR SYSTEMS

(75) Inventors: Elisa Rodrigues, Union City, CA (US); John E. Watkins, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 371 days.

(21) Appl. No.: 12/562,319

(22) Filed: Sep. 18, 2009

(65) Prior Publication Data
US 2011/0072172 A1     Mar. 24, 2011

(51) Int. Cl.
G06F 13/00    (2006.01)
G06F 5/00     (2006.01)
G06F 3/00     (2006.01)

(52) U.S. Cl. ............................................. 710/52; 710/33

(58) Field of Classification Search .................... 710/33, 710/52
See application file for complete search history.

(56) References Cited

U.S. PATENT DOCUMENTS

| | | | |
|---|---|---|---|
| 7,257,655 B1 | 8/2007 | Burney et al. | |
| 7,607,029 B2 | 10/2009 | Tseng et al. | |
| 2006/0153078 A1* | 7/2006 | Yasui | 370/235 |
| 2008/0288664 A1* | 11/2008 | Pettey et al. | 710/5 |

* cited by examiner

Primary Examiner — Eddie P Chan
Assistant Examiner — Zachary K Huson
(74) Attorney, Agent, or Firm — Meyertons, Hood, Kivlin, Kowert & Goetzel, P.C.; Stephen J. Curran

(57) ABSTRACT

An I/O device includes a host interface coupled to a plurality of hardware resources. The host interface includes a transaction layer packet (TLP) processing unit that may receive and process a plurality of transaction layer packets sent by a plurality of processing units. Each processing unit may correspond to a respective root complex. The TLP processing unit may identify a transaction type and a processing unit corresponding to each transaction layer packet and store each transaction layer packet within a storage according to the transaction type and the processing unit. The TLP processing unit may select one or more transaction layer packets from the storage for process scheduling based upon a set of fairness criteria using an arbitration scheme. The TLP processing unit may further select and dispatch transaction layer packets for processing by downstream application hardware based upon additional criteria.

20 Claims, 3 Drawing Sheets

INPUT/OUTPUT DEVICE INCLUDING A MECHANISM FOR TRANSACTION LAYER PACKET PROCESSING IN MULTIPLE PROCESSOR SYSTEMS

BACKGROUND OF THE INVENTION

1. Field of the Invention

This invention relates to computer systems and, more particularly, to shared input/output (I/O) resources

2. Description of the Related Art

There have been significant increases in the effective throughput of a variety of I/O devices used in computing systems. In the recent past, a number of new communication standards have been introduced. For example, 10 Gigabit Ethernet may allow up to ten gigabits of information to be conveyed and Peripheral Component Interconnect Express (PCIe™) Generation 1 may allow up to 2.5 Gbits per lane. In many computer systems, a single processor or processing module typically does not use that much I/O bandwidth. Accordingly, in an effort to increase hardware resource utilization, sharing of I/O hardware resources may be desirable.

One mechanism for sharing resources that use PCIe interfaces is to virtualize the resources across multiple processing elements. Thus, I/O virtualization standards have been introduced, such as for example, the single root and multi-root PCIe specifications. However, there are issues with sharing hardware resources. For example, many high-speed serial link technologies use a layered communication protocol. In such technologies, it may be challenging to process transactions that may be issued to a shared I/O subsystem by multiple processors or processing units, each of which may be running multiple processes.

SUMMARY

Various embodiments of an I/O device including a transaction layer packet processor are disclosed. In one embodiment, an I/O device includes a host interface coupled to a plurality of hardware resources such as DMA engines, and programmed I/O (PIO) configuration registers, for example. The host interface includes a transaction layer packet (TLP) processing unit that may be configured to receive and process a plurality of transaction layer packets sent by a plurality of processing units. Each processing unit may correspond to a respective root complex. The TLP processing unit may be configured to identify a transaction type and a processing unit corresponding to each transaction layer packet and to store each transaction layer packet within a storage according to the transaction type and the processing unit. The TLP processing unit may be further configured to select one or more transaction layer packets from the storage for process scheduling based upon a set of fairness criteria using an arbitration scheme such as a round robin scheme, for example. The TLP processing unit may be further configured to select and dispatch one or more transaction layer packets for processing by downstream application hardware based upon additional criteria such as whether the application hardware is ready, for example.

Figure 1:
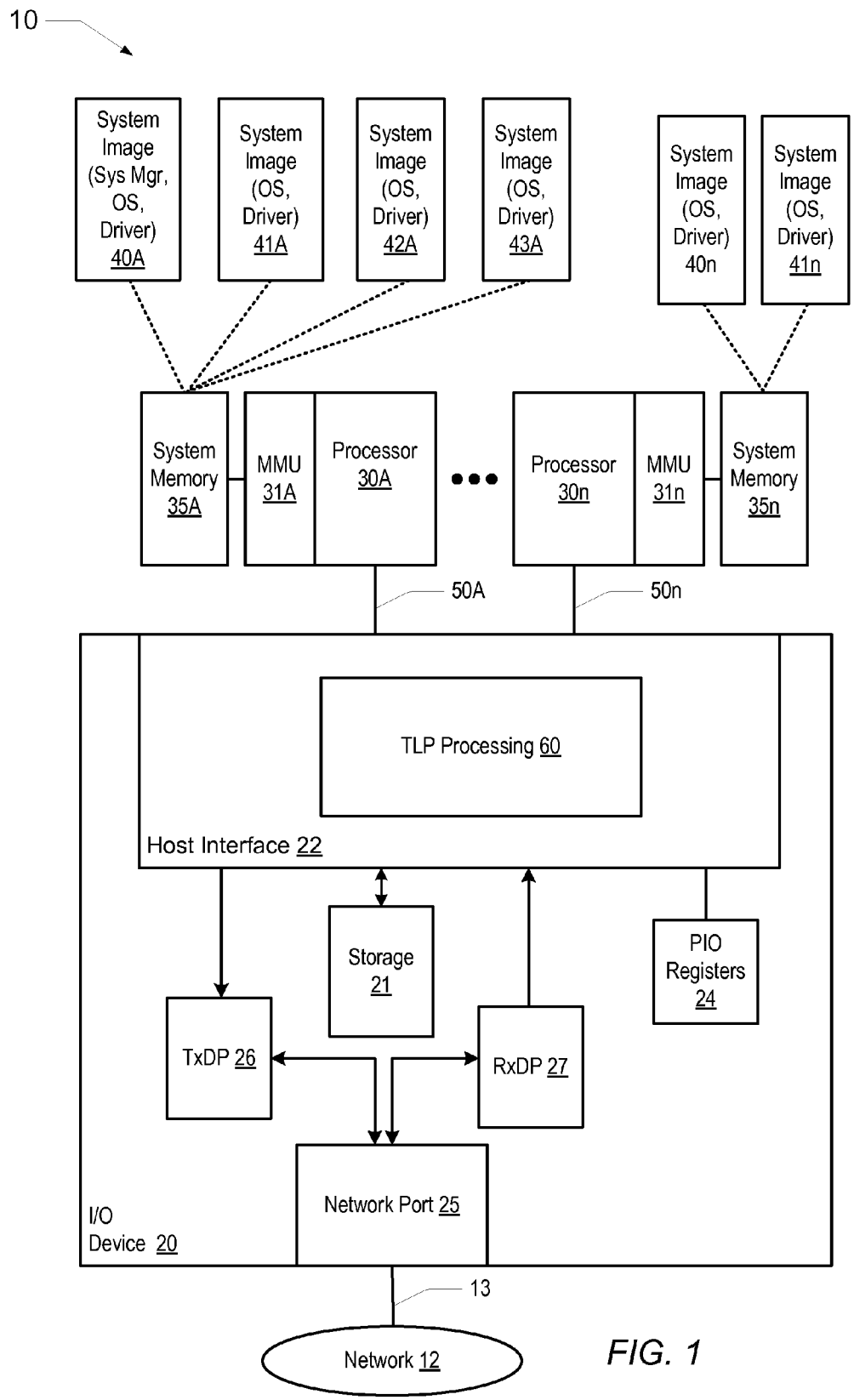
FIG. 1 is a block diagram of one embodiment of a computer system including a shared virtualized I/O device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

As mentioned above, sharing of I/O hardware resources may be desirable in some systems. Thus, I/O standards have been introduced. However, there are issues with virtualizing and sharing of hardware resources. More particularly, one issue is the data and resources of each process must be protected from access by any other process. Another issue is that each process should have the perception that it is the sole user of the hardware resource. In addition, using the shared I/O device, each process may provide posted, non-posted, and completion transaction layer packets that must be processed efficiently and with high throughput. Thus, as described below, a shared I/O device may be used to share a relatively high cost hardware component among a number of user processes across multiple processing units, and across multiple root complexes for PCIe links.

Turning now to FIG. 1, a block diagram of one embodiment of a computer system 10 including an I/O device 20 connected to a network 12 is shown. Computer system 10 includes a plurality of processors designated 30A and 30n, where n may be representative of any whole number. As shown, the processors 30A and 30n are coupled to the I/O device 20 via respective communication links 50A and 50n. The I/O device 20 is coupled to a network 12. As shown, processor 30A is also coupled to a memory management unit, designated MMU 31A, which is in turn coupled to a system memory 35A. Similarly, processor 30n is coupled to MMU 31n and system memory 35n. It is noted that components having reference designators with a number and letter may be referenced by just the number where appropriate.

In one embodiment, each of the processors 30 may be representative of any type of processing unit including a single processor, a chip multiprocessor that includes multiple central processing units (CPUs) on a single substrate, or a processing node such as a blade processing unit or blade server, for example, which may include one or more CPUs in a single housing.

In the illustrated embodiment, the MMU 31 may be configured to control accesses to system memory 35A, as well as manage memory and policy for caching of a particular data type. Further, in one embodiment, MMU 31 may be configured to grant or deny accesses to certain addresses within a programmed I/O (PIO) configuration space by device drivers, dependent upon whether the requesting device driver has been allocated the requested address space.

System memory 35 may be representative of any type of memory medium. For example, in various embodiments, system memory 35 may be implemented using memory devices in the dynamic random access memory (DRAM) family of devices. However, system memory 35 may also be implemented using static RAM (SRAM) or other types of storage devices as desired. System memory 35 may be used to store program instructions, which may be fetched and executed by the processors 30A and 30n.

More particularly, as shown in FIG. 1, a number of system images designated 40A-43A may be stored within system memory 35A, as denoted by the dotted lines. Each of the system images may be representative of an instance of system software that is running on a given CPU within processor 30A. For example, the system image may include a system manager instance, an operating system instance, a device driver instance, as well as any other system level software executing on a processing unit. In addition, there may be several instances of a device driver executing on a given CPU. For example, as described in greater detail below, a CPU may be running several processes, each requiring I/O hardware resources within the I/O device 20. In one embodiment, each of those processes may have its own device driver instance that may be used to discover and access the respective hardware resources that have been assigned to each respective process.

In the illustrated embodiment, the I/O device 20 includes a network port 25 that is coupled to the network 12 via a network link 13. The I/O device 20 also includes a host interface 22 that is coupled to a storage 21 and to PIO registers 24. The storage 21 may be representative of any type of storage. For example, in various embodiments, storage 21 may be implemented using hardware registers, DRAM, SRAM, or any of a variety of erasable programmable read only memory (EPROM) devices In addition, as shown the I/O device 20 includes a transmit data path designated TxDP 26 and a receive datapath designated RxDP 27. In various embodiments, the RxDP 27 may include filtering and classification, and scheduling functionality, among others for transactions received from the network 12. The TxDP 26 circuits may include arbitration and scheduling functionality for transactions going out to the network 12. It is noted that I/O device 20 may also include a variety of other circuits that have been omitted here for simplicity. For example, in various embodiments, I/O device 20 may include, a bus interface for connection to a service processor (not shown).

The network port 25 may provide a connection to the network 12 using a network protocol. In various embodiments, the network 12 may use any of a variety of frame-based protocols such as the Ethernet protocol. As such, in one embodiment the network connection may be a 10-Gigabit Ethernet (10GE) connection. Accordingly, network port 25 may be configured to provide a cable or optical interface, as well as other network functions such as medium access control (MAC) functions, physical (PHY) layer functions, and physical coding sublayer (PCS) functionality (all not shown). It is noted that in other embodiments, other network protocols may be supported.

In one embodiment, the host interface 22 may include a plurality of I/O interfaces (not shown) that may be representative of Peripheral Component Interconnect (PCI) Express (PCIe™) compliant physical layer interfaces, each representing a PCIe endpoint. Accordingly, each of the links (e.g., 50A and 50n) may be PCIe links that include a number of lanes. In addition, each I/O interface may be independently configurable by the system manager instance running on a given processor, or a service processor. As such, in one embodiment, each of the processors 30 may also include a host bridge, root ports, root complex event collectors, and root complex endpoints (all not shown) and which may correspond to a PCIe root complex.

In one embodiment, I/O device 20 may be a virtualized device. As such, the host interface 22 may provide a shared set of resources (e.g., MAC, statistics and control, DMA channels, PIO configuration space) that allow each processor 30 to substantially transparently share the network port 25. The PIO registers unit 24 includes number of configuration and status registers, and supports memory mapped I/O posted and non-posted transactions. Each separate link 50 goes through an independent negotiation between each Processor 30 and the Host Interface 22 to determine the link width, link speed, and the specific parameters pertaining to the lanes which comprise each link.

Accordingly, in the virtualized environment, the I/O device 20 may provide a flexible number of I/O resources to a number of processes executing on the processing units 30. In one embodiment, the system manager or service processor may determine and allocate the hardware resources of the I/O device 20 among the processes during an initialization of computer system 10. The I/O device 20 may be configured to provide a measure of protection for the allocated resources such that no process may either accidentally or otherwise access the resources that have been allocated to another process.

More particularly, processors 30 may generate transaction requests to the I/O device 20 such as posted writes, non-posted reads, and configuration writes, and completions, for example. At the transaction layer, the request packets may be processed by TLP processing unit 60. As described in greater detail below in conjunction with the description of FIG. 2, in one embodiment, the TLP processing unit 60 may receive the packets, and while keeping the transactions from different processor hierarchies separated, the TLP processing unit 60 may perform error checking, arbitration, buffering, scheduling, and dispatching of the requests to the various applications that may perform the requested operations.

In one embodiment, a processor hierarchy represents an independent address space. More particularly, a processor hierarchy refers to the set of registers that are within the I/O address space or address spaces which belong to that processor. In a single processor system, there is generally one hierarchy and all I/O devices and the registers within those devices are within that hierarchy. In a multiple processor system such as computer system 10, for example, there may be multiple hierarchies where each processor is able to access only the devices or set of device registers which have been placed within the address space(s) of that processor. Accordingly, the host interface 22 may logically provide separate resources for each processor and isolate each resource set so only the processor whose address space contains them can gain access. The partitioning of I/O device resources into hierarchies is generally done prior to system software performing an I/O device enumeration such that when it occurs, each processor builds its respective I/O device tree that is representative of how the device is to be partitioned amongst multiple processors.

Figure 2:
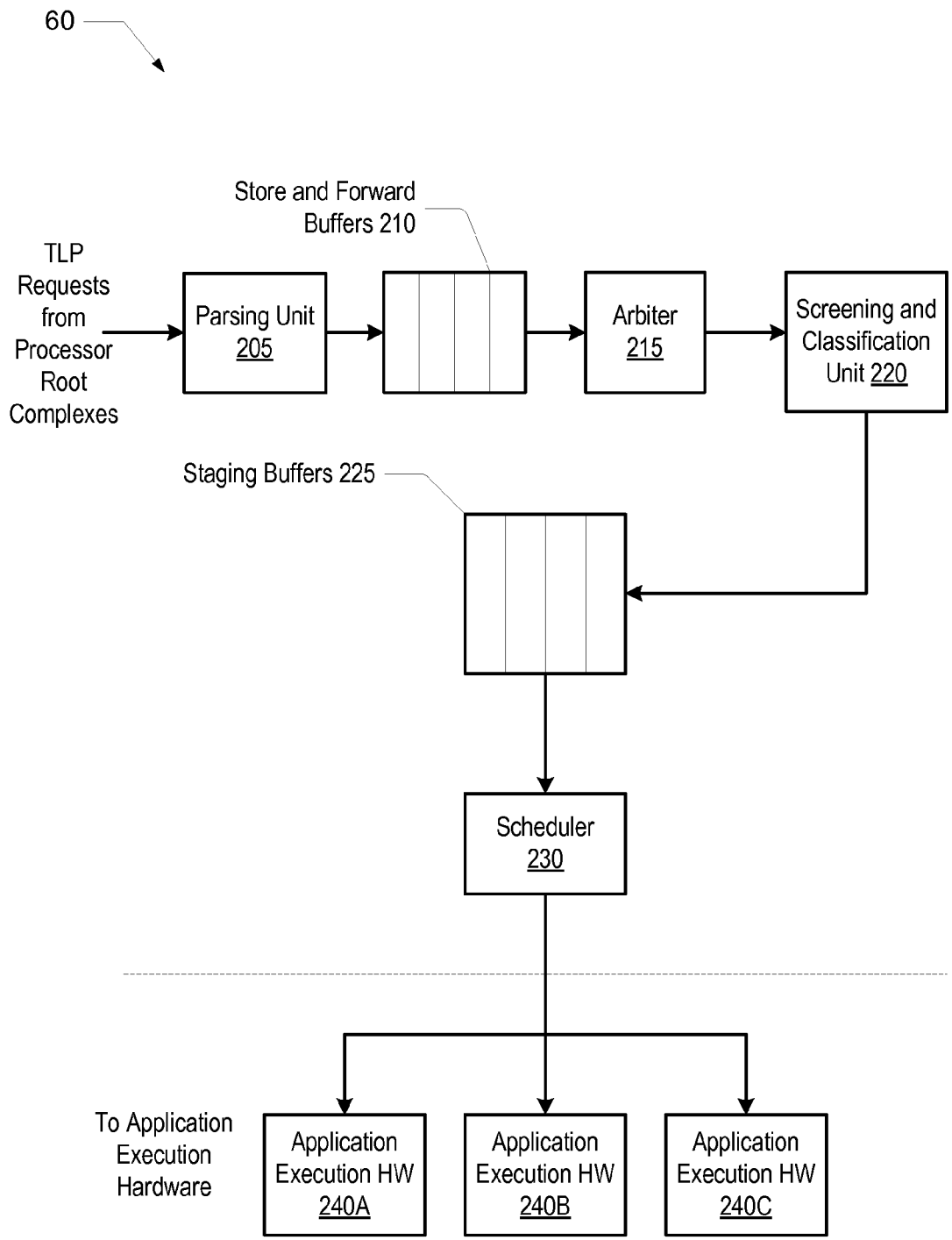
FIG. 2 is a block diagram illustrating more detailed aspects of an embodiment of the transaction layer packet processing unit shown in FIG. 1.

Referring to FIG. 2, a block diagram of one embodiment of the TLP processing unit of FIG. 1 is shown. The TLP processing unit 60 includes a parsing unit 205 that is coupled to a storage unit designated as store and forward buffers 210. The store and forward buffers 210 are coupled to an arbiter 215, which are in turn coupled to a screening and classification unit 220. The screening and classification unit 220 is coupled to a staging buffer unit 225, which is coupled to a scheduler 230. It is noted that although the staging buffer unit 225 and the store and forward buffers 210 are shown as separate entities, it is contemplated that in various embodiments, they may be implemented as one physical storage device such as, for example, storage 21 of FIG. 1. It is noted that although store and forward buffers are used in the embodiment of FIG. 2 and elsewhere, it is contemplated that in other embodiments, other buffer architectures may be used.

The parsing unit 205 is configured to receive transaction layer packets from all the processor hierarchies. In one embodiment, the packets may be received as a packet stream. The parsing unit 205 may also be configured to determine to which processor 30 each packet belongs and to what category of transaction does each packet correspond. For example, each processor or each CPU within a processor 30 may be assigned a unique identifier. That identifier may be included in each packet. In one embodiment, the identifier may be encoded in a particular packet header field for example. The transaction category may be determined based upon the type of transaction request. As mentioned above, the packets may be either a posted, non-posted, or completion packets.

To maintain isolation, parsing unit 205 may store the packets in the store and forward buffers 210 based upon the processor identifier, and also by the transaction type (category). For example, store and forward buffers 210 may be a number of individual storage units such as first in first out devices that serve as storage queues. Alternatively, store and forward buffers 210 may be a single storage that is divided into separately accessible storage queues. In either case, in one embodiment, parsing unit 205 may store all posted and non-posted packets associated with a particular processing unit together in the same queue. Similarly, parsing unit 205 may store completion packets within a different queue according to the processing unit. In other words, if there are N processing hierarchies, the store and forward buffers 210 may include N queues for posted and non-posted requests, and N completion queues, where N may be any number.

In addition, the parsing unit 205 may be configured to perform preliminary error checking on the received packets. For example, parsing unit 205 may check to ensure that packets are complete, and that end-to-end cyclic redundancy code (ECRC) and/or error correcting codes (ECC) codes match, that no payload size violations are present, packets are not malformed, and so on. Additional error checking may be performed during subsequent processing, as described below. Further, parsing unit 205 may store the packets in an aligned manner for downstream recipients. For example, the start of a given packet may be stored in the byte zero position of a given queue.

Arbiter 215 may include arbitration logic (not shown) that may be configured to fairly select which of the requests stored within the store and forward buffers 210 will proceed for subsequent processing while adhering to transaction layer ordering rules. More particularly, in one embodiment, arbiter 215 may select during each arbitration cycle, a single request from a given processor hierarchy. However, it is contemplated that in other embodiments, arbiter 215 may select more than one request each arbitration cycle. In one embodiment, the selection rules are based on a round robin policy in which a request may be selected each arbitration cycle beginning with a first processor hierarchy and successively proceeding to a next processor hierarchy until the last processor hierarchy is reached. Any processor hierarchy that does not contain a request may be skipped. In addition, during each arbitration cycle, arbiter 215 may determine whether a buffer queue within the staging buffer 225 is available to store a selected request. If a corresponding buffer queue is not available, then that processor hierarchy is skipped. Likewise, to preserve PCIe ordering rules, a given processor hierarchy may be skipped if arbiter 215 determines that a previously launched write operation to a PCIe configuration status register (CSR) is still in progress for that processor hierarchy. It is noted that in other embodiments, arbitration policies other than round robin may be used.

Access requests to various resources must be permissible. Accordingly, the screening and classification unit 220 may be configured to screen requests that are not eligible for subsequent downstream processing and to categorize the requests that should be processed by specific subsystems of the applications that execute the requests. More particularly, in one embodiment the screening and classification unit 220 may determine whether an access is a supported request using one or more sets of criteria. For example, non-supported requests include: accesses that do not map into any function's base address register (BAR) mapped memory space, accesses to an address which may be inaccessible due to, for example, a function's memory space being disabled, access to a non-existent function's CSR space, access of a function's non-CSR space resources when that function is not in a correct power state (e.g., the D0 power state), accesses that violate the application programming model, and accesses that are determined to be poisoned requests. Thus, the screening and classification unit 220 provides a measure of protection from a request performing an unauthorized access to resources that it has not been allocated.

In addition, in one embodiment, the screening and classification unit 220 may be configured to discard packets which violate transaction layer packet protocol and may require a detailed inspection. As described above, the parser unit 205 may perform some preliminary error checking. However, the logic needed to make these checks may be too extensive to meet the I/O device clock cycle time if performed by the parser unit 205. Further, the application hardware may have restrictions on packet transaction type, payload size, address alignment, access permissions (e.g. a function may be limited to a subset of its BAR address assignment under certain conditions), or other constraints which may go beyond the general protocol restrictions. In such cases, the transaction layer packets which violate those application specific restrictions should be discarded, and an error response should be issued. Thus, rather than the application hardware performing those tasks, the screening and classification unit 220 may be configured to perform the above tasks and thus only allows packets which meet both general transaction layer protocol and any additional constraints imposed by the specific application to proceed further to a processing sub-block.

In one embodiment, the screening and classification unit 220 includes comparison logic (not shown) that may be configured to compare an address in each request packet with the set of addresses contained in each of the function's respective BARs. More particularly, during I/O device discovery and enumeration by the OS, each function's BARs may be programmed, and the memory space or I/O space is allocated. Thus, the comparison logic in the screening and classification unit 220 may be configured to compare those sets of addresses with an incoming address. The screening and classification unit 220 may associate a matching address with an access by a processing unit 30 to a specific portion of the application hardware. If there is no matching address, or a configuration access is to a non-existent function, the screening and classification unit 220 may be configured to initiate error handling, and in one embodiment, the corresponding packet may be discarded.

In addition to screening access requests, the screening and classification unit 220 may be configured to classify requests targeting specific application hardware and to mark those requests so that subsequent processing can more efficiently process the requests. The screening and classification unit 220 stores the requests in the staging buffers 225.

The staging buffers 225 may be configured to store requests that are awaiting scheduling and dispatch. Similar to the store and forward buffers 210 described above, the staging buffers 225 may also provide isolation between processing root complexes. For example, in one embodiment, staging buffers 225 may be divided into a number of independently accessible segments, one segment for each processor hierarchy. Each of the segments may store a given number of transactions. Each segment may be implemented in a FIFO-like structure. In one embodiment, if a segment becomes full, the staging buffer 225 may be configured to notify the arbiter 215, so that the arbiter 215 may skip requests from the processing hierarchy that is associated with the segment that is full.

In one embodiment, staging buffers 225 may be implemented as a dual ported memory device in which a single read port and a single write port are used. However, it is contemplated that in other embodiments, staging buffers 225 may be implemented with multiple read and write ports that may be concurrently accessed.

The staging buffers 225 may also provide a measure of decoupling between the incoming operation stream synchronization issues such as PCIe ordering rules that may be imposed in previous stages, and the downstream processing issues such as portions of the application hardware being busy and not able to process a new operation. More particularly, the staging buffers 225 and scheduler 230 are configured to issue operations to the application hardware execution units as fast as they can consume the operations.

The scheduler 230 may be configured to route incoming requests to the correct processing sub-block of the application hardware (e.g., application execution hardware 240A-240C). Scheduler 230 may use a fairness mechanism to select requests from the processing hierarchies. For example, in one embodiment, a modified round robin selection scheme may be used. In one embodiment, scheduler 230 may determine whether the target hardware is busy, and in the case of non-posted requests that require a completion response, the scheduler 230 may elect to not issue a request to a processing sub-block until sufficient credits are available and reserved so that the sub-block is assured to have sufficient completion credits to reply to the request. Credits are storage units that may represent a predetermined amount (e.g., 64 B, 128 B, etc.) of storage availability in a particular storage (e.g., a buffer).

Accordingly, as the scheduler 230 moves from hierarchy to hierarchy in the staging buffers 225, scheduler 230 may skip a hierarchy if the downstream processing sub-block is busy. For example, the scheduler 230 may receive busy signals from the various downstream processing sub-blocks (e.g., application execution hardware 240A and 240B). These busy signals may serve to notify the scheduler 230 that a particular sub-block is still processing a previous operation, and cannot yet process another one. In one embodiment, some processing sub-block execution units (e.g., application execution hardware 240A and 240C) may execute in parallel. As such, the scheduler 230 may dispatch more than one operation to those sub-blocks. In such embodiments, the processing sub-blocks may provide busy signals that are indicative of the parallel nature of the execution hardware.

Similarly, scheduler 230 may skip a hierarchy if there is insufficient buffer space in the requesting processing hierarchy to receive a completion. More particularly, in one embodiment, since non-posted requests must be able to execute to completion, the scheduler 230 may attempt to reserve completion credits in advance when a request is a non-posted request. If the credits are unavailable, the non-posted request is not launched, and the hierarchy is skipped for that cycle. The next time that hierarchy comes up for scheduling, the available completion credits may again be evaluated in a similar fashion.

In one embodiment, the downstream application hardware (i.e., processing sub-blocks of application execution hardware 240A-240C) may include control registers and the hardware that manipulates them, an EPROM access unit, access to interrupt vectors stored in SRAM, access to configuration space registers, DMA engine registers for a storage controller, and the like.

Figure 3:
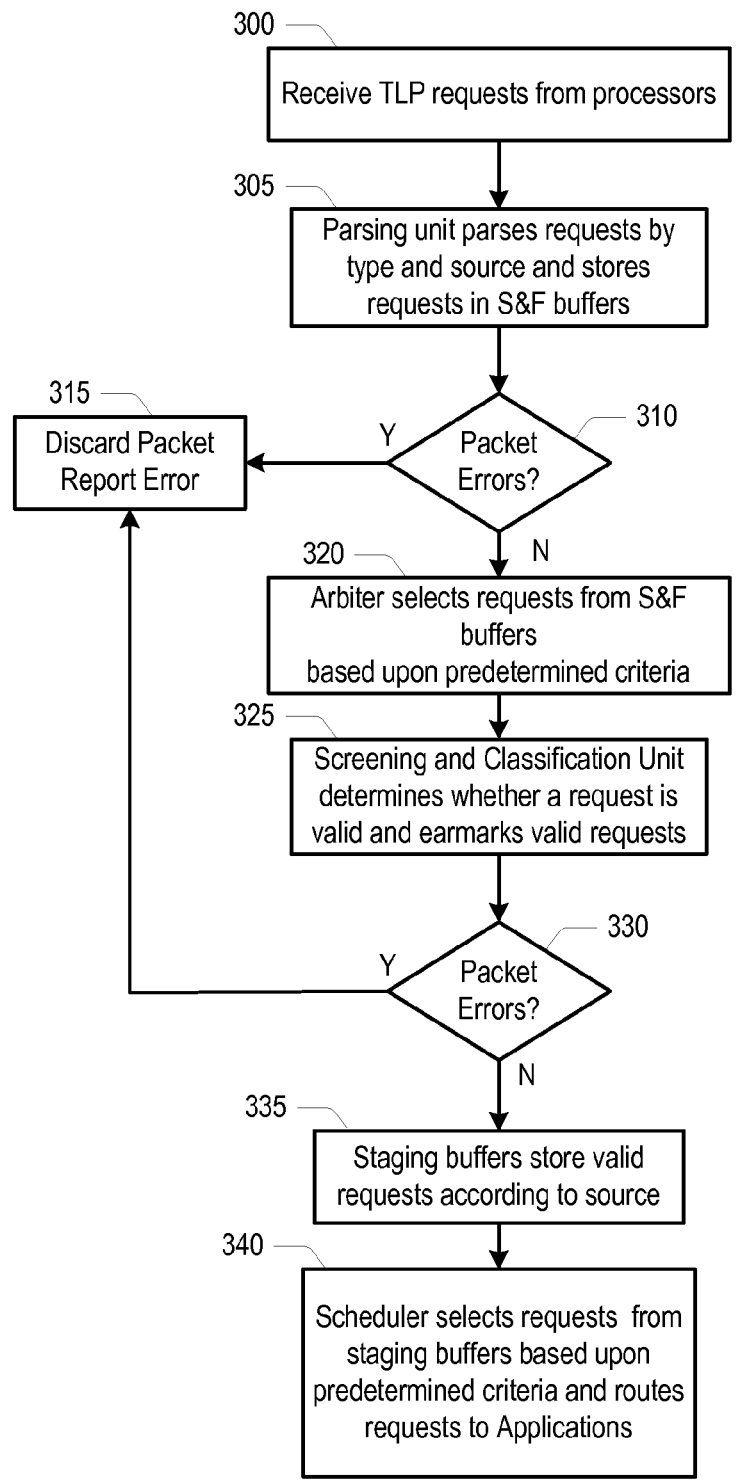
FIG. 3 is a flow diagram describing operational aspects of an embodiment of the transaction layer packet processing unit of the virtualized I/O device shown in FIG. 1 and FIG. 2.

FIG. 3 is a flow diagram that provides operational details of the embodiments shown in FIG. 1 and FIG. 2. Referring collectively to FIG. 1 though FIG. 3, and beginning in block 300 of FIG. 3, host interface 22 receives requests via the physical layer (e.g., the communication links 50). The physical layer signals may be converted to the transaction layer and packetized. The transaction layer packets are provided to the parsing unit 205, which receives the requests from all processing unit hierarchies/root complexes. The parsing unit 205 determines the transaction source (e.g., processing hierarchy) and the transaction type (e.g., posted, non-posted, completion), and stores the packets in the store and forward buffers 210 according to the processing hierarchy. In addition, parsing unit determines whether there are any errors in the packets as described above (block 310). If there are error conditions, parsing unit 205 may discard the packet, and initiate error handling procedures, which may include simply reporting the error back upstream (block 315). If there are no errors (block 310), the stored packets in the store and forward buffers 210 may be eligible for further processing.

More particularly, the arbiter 215 may fairly select a request each arbitration cycle from the store and forward buffers 210 using a round robin policy as described above. However, the arbiter 215 may skip a processing hierarchy for various reasons such as, for example, the selected hierarchy has no pending requests. In addition, as described above, to satisfy transaction layer ordering rules, if there are no buffer segments available in the staging buffers 225 for the selected processing hierarchy, that hierarchy may be skipped. Further, to preserve PCIe ordering rules, a given processor hierarchy is skipped if arbiter 215 determines that a previously launched write operation to a PCIe configuration status register (CSR) is still in progress for that processor hierarchy (block 320).

In one embodiment, the screening and classification unit 220 screens (i.e., evaluates) each selected request and determines whether the selected request is a supported request using the exemplary set of criteria given above. For example, using address comparisons, screening and classification unit 220 may identify non-supported requests. In addition to screening access requests, the screening and classification unit 220 may be configured to classify requests targeting specific application hardware (e.g., application execution hardware 240A of FIG. 2) and to mark those requests so that subsequent processing can more efficiently process the requests (block 325). In addition, if the address comparisons do not yield a match, or a configuration access is to a non-existent function, the screening and classification unit 220 determines an error has occurred (block 330). As such the screening and classification unit 220 may be configured to initiate error handling, and in one embodiment, the corresponding packet may be discarded as described above in block 315.

Referring back to block 330, if there are no packet errors, the screening and classification unit 220 stores the requests in the staging buffers 225 according to the processing hierarchy, as described above (block 335). Once the packets are stored in the staging buffers 225, scheduler 230 selects and routes requests from the staging buffers 225, to the application hardware processing sub-blocks based upon predetermined selection criteria, as described above. More particularly, each selection cycle, the scheduler 230 moves from hierarchy to hierarchy in the staging buffers 225. The scheduler 230 may skip a hierarchy if, for example, the downstream processing sub-block is busy, or is insufficient buffer space in the requesting processing hierarchy to receive a completion based on available completion credits.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An input/output (I/O) device comprising:
   a host interface; and
   a plurality of hardware resources coupled to the host interface;
   wherein the host interface includes a transaction layer packet (TLP) processing unit configured to receive and process a plurality of transaction layer packets sent by a plurality of processing units, each processing unit corresponding to a respective root complex;
   wherein the TLP processing unit is configured to identify a transaction type and a processing unit corresponding to each transaction layer packet and to store each transaction layer packet within a storage according to the transaction type and the processing unit;
   wherein the TLP processing unit is further configured to select from the storage one or more transaction layer packets for scheduling; and
   wherein the TLP processing unit is further configured to select and dispatch one or more transaction layer packets for processing by downstream application hardware.

2. The device as recited in claim 1, wherein the transaction type corresponds to peripheral component interconnect (PCIe) transaction types including posted, non-posted, and completion types.

3. The device as recited in claim 1, wherein each processing unit corresponds to a processing hierarchy within a multi-root processing hierarchy.

4. The device as recited in claim 1, wherein the TLP processing unit is further configured to store the transaction layer packets awaiting dispatch within a second storage according to the transaction type and the processing unit.

5. The device as recited in claim 4, wherein the TLP processing unit is further configured to select one or more transaction layer packets for scheduling based upon whether space is available within the second storage.

6. The device as recited in claim 1, wherein the TLP processing unit is further configured to select transaction layer packets that are associated with a given processing unit based upon whether the given processing unit has available buffer space to receive a corresponding completion packet.

7. The device as recited in claim 1, wherein the TLP processing unit is further configured to determine whether each transaction layer packet selected from the storage is valid based upon a target address of the selected transaction layer packet.

8. The device as recited in claim 1, wherein the TLP processing unit is further configured to select and dispatch the transaction layer packets for processing by downstream application hardware at a rate that matches a processing speed of the application hardware.

9. A system comprising:
   a plurality of processing units, each corresponding to a respective root complex; and
   an input/output (I/O) device coupled to each of the plurality of processing units via a respective communication link;
   wherein the I/O device includes:
       a transaction layer packet (TLP) processing unit configured to receive and process a plurality of transaction layer packets sent by the plurality of processing unit;
       wherein the TLP processing unit is configured to identify a transaction type and a processing unit corresponding to each transaction layer packet and to store each transaction layer packet within a storage according to the transaction type and the processing unit;
       wherein the TLP processing unit is further configured to select from the storage one or more transaction layer packets for scheduling; and
       wherein the TLP processing unit is further configured to select and dispatch one or more transaction layer packets for processing by downstream application hardware.

10. The system as recited in claim 9, wherein the TLP processing unit is further configured to store the transaction layer packets awaiting dispatch within a second storage according to the transaction type and the processing unit.

11. The system as recited in claim 10, wherein the TLP processing unit is further configured to select one or more transaction layer packets for scheduling based upon whether space is available within the second storage.

12. The system as recited in claim 9, wherein the TLP processing unit is further configured to select for dispatch transaction layer packets that are associated with a given processing unit based upon whether the given processing unit has available buffer space to receive a corresponding completion packet.

13. The system as recited in claim 9, wherein the TLP processing unit is further configured to discard a given transaction layer packet selected from the storage in response to determining that the given transaction layer packet violates one or more protocol restrictions including packet transaction type, payload size, and address alignment.

14. The system as recited in claim 9, wherein the TLP processing unit is further configured to select and dispatch the transaction layer packets for processing by downstream application hardware at a rate that matches a processing speed of the application hardware.

15. A method comprising:
   a transaction layer packet (TLP) processing unit of an input/output device receiving and processing a plurality of transaction layer packets sent by a plurality of processing unit, each processing unit corresponding to a respective root complex;
   the TLP processing unit identifying a transaction type and a processing unit corresponding to each transaction layer packet;
   storing each transaction layer packet within a first storage according to the transaction type and the processing unit;
   the TLP processing unit selecting and storing within a second storage one or more transaction layer packets for scheduling; and
   the TLP processing unit selecting and dispatching one or more transaction layer packets for processing by downstream application hardware based on demand of the downstream application hardware.

16. The method as recited in claim 15, further comprising the TLP processing unit storing the transaction layer packets awaiting dispatch within the second storage according to the transaction type and the processing unit that sent the packets.

17. The method as recited in claim 15, further comprising the TLP processing unit selecting one or more transaction layer packets for scheduling from the first storage based upon whether space is available within the second storage.

18. The method as recited in claim 15, further comprising the TLP processing unit selecting for dispatch transaction layer packets that are associated with a given processing unit based upon whether the given processing unit has available buffer space to receive a corresponding completion packet.

19. The method as recited in claim 15, further comprising the TLP processing unit discarding a given transaction layer packet selected from the storage in response to determining that the given transaction layer packet violates one or more access permissions.

20. The method as recited in claim 15, further comprising the TLP processing unit selecting and dispatching the transaction layer packets for processing by downstream application hardware at a rate that matches a processing speed of the application hardware.

\* \* \* \* \*